US008293836B2

(12) United States Patent
Cranfill et al.

(10) Patent No.: US 8,293,836 B2
(45) Date of Patent: *Oct. 23, 2012

(54) CURABLE COATING COMPOSITION CONTAINING A COMPOUND HAVING A URETDIONE GROUP AND A DIFFERENT FUNCTIONAL GROUP AND CURED COATINGS

(75) Inventors: David C. Cranfill, Whitmore Lake, MI (US); Walter H Ohrbom, Hartland Township, MI (US); Patrick J Mormile, Birmingham, MI (US)

(73) Assignee: BASF Coatings GmbH, Münster (DE)

( * ) Notice: Subject to any disclaimer, the term of this patent is extended or adjusted under 35 U.S.C. 154(b) by 576 days.

This patent is subject to a terminal disclaimer.

(21) Appl. No.: 12/469,158

(22) Filed: May 20, 2009

(65) Prior Publication Data

US 2010/0297355 A1   Nov. 25, 2010

(51) Int. Cl.
| | |
|---|---|
| B32B 27/00 | (2006.01) |
| B32B 27/40 | (2006.01) |
| C08F 8/30 | (2006.01) |
| C08F 20/00 | (2006.01) |
| C08F 283/04 | (2006.01) |
| C08G 18/00 | (2006.01) |
| C08G 18/08 | (2006.01) |
| C08G 18/28 | (2006.01) |
| C08G 18/77 | (2006.01) |
| C08G 18/81 | (2006.01) |
| C08G 63/00 | (2006.01) |
| C08G 73/00 | (2006.01) |
| C08J 3/00 | (2006.01) |
| C08K 3/20 | (2006.01) |
| C08L 75/00 | (2006.01) |

(52) U.S. Cl. ............... 524/589; 428/423.1; 524/590; 524/591; 524/839; 524/840; 525/123; 525/440.01; 525/440.02; 525/455; 528/44; 528/45; 528/73

(58) Field of Classification Search ............ 524/589, 524/590, 591, 839, 840; 525/123, 440.01, 525/440.02, 455; 528/44, 45, 73; 428/423.1
See application file for complete search history.

(56) References Cited

U.S. PATENT DOCUMENTS

| | | | |
|---|---|---|---|
| 4,504,628 A | 3/1985 | Johnson | |
| 5,760,127 A | 6/1998 | Bammel et al. | |
| 5,814,689 A | 9/1998 | Goldstein et al. | |
| 5,872,165 A | 2/1999 | Oberg et al. | |
| 5,945,499 A | 8/1999 | Ohrbom et al. | |
| 6,037,441 A | 3/2000 | Ohrbom et al. | |
| 6,048,443 A | 4/2000 | December et al. | |
| 6,166,148 A | 12/2000 | Ohrbom et al. | |
| 6,180,240 B1 | 1/2001 | St. Aubin et al. | |
| 6,391,390 B1 | 5/2002 | Boisseau et al. | |
| 6,569,956 B1 | 5/2003 | Ramesh | |
| 6,914,115 B2 | 7/2005 | Spyrou et al. | |
| 7,129,280 B2 | 10/2006 | Baumgart et al. | |
| 7,300,997 B2 | 11/2007 | Wenning et al. | |
| 7,307,135 B2 | 12/2007 | Spyrou | |
| 7,416,781 B2 | 8/2008 | Niemeier et al. | |
| 7,446,142 B2 | 11/2008 | Meisenburg et al. | |
| 2003/0050424 A1 | 3/2003 | Bernard | |
| 2003/0125501 A1 | 7/2003 | Ohrbom et al. | |
| 2004/0219367 A1 | 11/2004 | Spyrou et al. | |
| 2005/0003206 A1 | 1/2005 | Spyrou et al. | |
| 2005/0090636 A1 | 4/2005 | Wenning et al. | |
| 2005/0096450 A1 | 5/2005 | Spyrou et al. | |
| 2005/0119437 A1 | 6/2005 | Wenning et al. | |
| 2005/0239956 A1 | 10/2005 | Spyrou et al. | |
| 2005/0239992 A1 | 10/2005 | Spyrou et al. | |
| 2007/0032594 A1 | 2/2007 | Mazanek et al. | |
| 2007/0259120 A1 | 11/2007 | Haubennestel et al. | |
| 2007/0266897 A1 | 11/2007 | Spyrou et al. | |
| 2008/0097025 A1 | 4/2008 | Spyrou et al. | |
| 2008/0139753 A1 | 6/2008 | Spyrou et al. | |
| 2008/0269415 A1 | 10/2008 | Spyrou et al. | |
| 2010/0137507 A1 | 6/2010 | Bernard et al. | |
| 2010/0298490 A1* | 11/2010 | Caiozzo et al. | 524/590 |

FOREIGN PATENT DOCUMENTS

| | | | |
|---|---|---|---|
| DE | 19804980 | * | 8/1999 |
| EP | 0 191 915 | | 8/1986 |
| EP | 0 864 575 | | 9/1998 |
| EP | 1 063 269 | | 12/2000 |
| FR | 2 914 309 | | 10/2008 |
| WO | WO 2010/046327 | | 4/2010 |

OTHER PUBLICATIONS

English abstract of DE 19804980 Gras, Aug. 1999.*
Database search results (28 pages).
M. Edelmann et al., Thermokinetic analysis of two-step curing reactions in melt Part I. Investigation of low molecular model systems, Thermochimica Acta 452 (2007) 59-64.
M. Edelmann et al., Influence of various catalysts on the 1,3-diacetidine-2,4-dione (uretdione) reaction with hydroxyl groups. Progress in Organic Coatings 57 (2006) 251-258.
E. Querat et al., Blocked Isocyanate: Reaction and thermal behaviour of the toluene 2,4-diisocyanate dimer, Die Angewandte Makromolekulare Chemie 242 (1996) 1-36 (Nr. 4121).
Emmanouil Spyrou et al., "Highly Reactive, Blocking Agent—Free Polyurethane Powder Coatings" PCI article dated Nov. 1, 2005.
International Search Report and Written Opinion for Application No. PCT/US2010/028308 mailed Feb. 7, 2010.

* cited by examiner

*Primary Examiner* — Patrick Niland
(74) *Attorney, Agent, or Firm* — Harness, Dickey & Pierce, P.L.C.

(57) ABSTRACT

A curable coating composition includes a uretdione compound having one uretdione group and having a plurality of functional groups selected from crosslinkable groups and groups that modify a coating property. The disclosed coating compositions include those having a binder component having a plurality of active hydrogen-containing groups. When the uretdione compound has a functional group that is a crosslinkable group, the coating composition further includes a crosslinker that has a plurality of crosslinking groups reactive under curing conditions with the crosslinkable group. Also disclosed is a method of making the curable coating composition, including preparing the uretdione compound having one uretdione group and having at least one further functional group.

5 Claims, No Drawings

CURABLE COATING COMPOSITION CONTAINING A COMPOUND HAVING A URETDIONE GROUP AND A DIFFERENT FUNCTIONAL GROUP AND CURED COATINGS

FIELD OF INVENTION

The invention or inventions described in this disclosure relate to curable coating compositions containing uretdione compounds and cured coatings derived from such coating compositions.

BACKGROUND INFORMATION

This section provides background information that may or may not include prior art.

Isocyanate oligomers, such as uretdiones, biurets, and isocyanurates, have been used as crosslinkers in curable coating compositions. For example, such isocyanate oligomers, blocked or unblocked, have been used to crosslink active hydrogen-containing binder systems. The isocyanate groups that are not part of the isocyanurate, biuret, or uretdione ring react with the active hydrogen groups of the binder if unblocked, or, if blocked, undergo that reaction under unblocking conditions. Usually, unblocking occurs at an elevated temperature. Catalysts may be added to facilitate the reaction of the free or unblocked isocyanate groups with the active hydrogen groups of the binder.

Spyrou et al. of Degussa AG have described polyurethane compositions containing uretdione groups in U.S. Pat. Nos. 7,307,135; 7,300,997; and 6,914,115 and in U.S. Patent Application Publications 2008/0269415; 2008/0139753; 2008/0097025; 2007/0266897; 2005/0239956; 2005/0239992; 2005/0119437; 2005/0096450; 2005/0003206; and 2004/0219367. The coating binders contain a uretdione hardener based on an aliphatic polyisocyanate having very low free isocyanate content and a hydroxyl-containing compound, along with a catalyst to accelerate cleavage of the uretdione groups. The isocyanate groups generated on cleaving the uretdione cure the hydroxyl-containing compound. The uretdione hardener is made by reacting a polyisocyanate in the presence of a dimerization catalyst to a desired conversion, e.g. isocyanate (NCO) content of less than 5% by weight, at which point a catalyst poison is added. The hydroxyl-containing compound that is cured may be a polyester, polyether, polyacrylate, polyurethane, or polycarbonate polymer. Mazanek et al., U.S. Patent Application Publication 2007/0032594 describes an aqueous dispersion of a self-crosslinking polyurethane containing uretdione groups, carboxylic acid or carboxylate groups, and amine or hydroxyl groups.

Certain patents have described coating compositions that cure through more than one kind of reaction, for example Meisenburg et al., U.S. Pat. No. 7,446,142; Neimeier et al., U.S. Pat. No. 7,416,781; Baumgart et al., U.S. Pat. No. 7,129,280; Ramesh, U.S. Pat. No. 6,569,956; December et al., U.S. Pat. No. 6,048,443; and Ohrbom et al., U.S. Pat. No. 5,945,499. Certain patents have described coatings additives covalently bound to a binder polymer, for example Boisseau et al., U.S. Pat. No. 6,391,390; St. Aubin et al., U.S. Pat. No. 6,180,240; Ohrbom et al., U.S. Pat. No. 6,166,148; Ohrbom et al, U.S. Pat. No. 6,037,441; Oberg et al., U.S. Pat. No. 5,872,165; and Johnson, U.S. Pat. No. 4,504,628. These patents and the described uretdione patents do not, however, suggest or presage the unexpected benefits and advantages available from the compositions and processes now disclosed and described.

SUMMARY OF THE DISCLOSURE

The present disclosure is of curable coating compositions that include uretdione compounds having one uretdione group and having a plurality of functional groups selected from crosslinkable groups and groups that modify a coating property. By "crosslinkable group" we mean a functional group that, under curing conditions, reacts with another functional group in the coating to form a covalent bond. By a "group that modifies a coating property" we mean a functional group that improves the performance of the cured coating without itself being a crosslinkable group. By way of nonlimiting examples, the groups that modify a coating property include groups that improve the weatherability or durability of coatings, the scratch and mar resistance of coatings, and adhesion of subsequent materials (e.g., repair coating or adhesives such as for glass attachment) to the coating.

The disclosed coating compositions include those having a binder component having a plurality of active hydrogen-containing groups. In certain embodiments, the active hydrogen-containing groups are selected from hydroxyl groups, primary and secondary amine groups, activated methylene protons (such as those of 2,4-alkanediones or alkyl acetoacetates), and combinations of these. The material having a plurality of active hydrogen-containing groups may be a compound, oligomer, or polymer. "Binder" refers collectively to the organic film formers in the coating.

When the uretdione compound has a functional group that is a crosslinkable group, the coating composition further includes a crosslinker that has a plurality of crosslinking groups reactive under curing conditions with the crosslinkable group.

Also disclosed is a method of making a curable coating composition, including preparing the uretdione compound having one uretdione group and having at least one further functional group by reacting one mole of a uretdione precursor compound of structure (I)

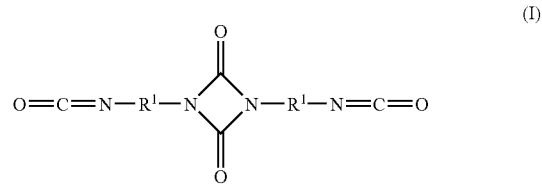

wherein each $R^1$ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylalkylene groups, and alkyl portions of alkylarylene groups may be linear, branched, or cyclic;

with two moles of compounds (II) selected from compounds having one group having an active hydrogen reactive with isocyanate and having at least one functional group selected from crosslinkable groups and groups that modify a coating property to form a uretdione compound with a plurality of functional groups selected from crosslinkable groups and groups that modify a coating property, the reaction being carried out under conditions in which the isocyanate groups but not the uretdione group of compound (I) react with the active hydrogens of the compounds (II); and combining the uretdione compound with functional groups selected from crosslinkable groups and groups that modify a coating property with a material having a plurality of active hydrogen groups in a curable coating composition. It is useful, when the uretdione compound has as functional groups one or more crosslinkable groups, for the binder of the curable coating composition to include another material with a functional group that is reactive with the crosslinkable group under curing conditions to form a covalent bond.

In certain embodiments, the uretdione compound has one or more functional groups that are crosslinkable groups such as carbamate, cyclic carbonate, activated alkene, F—Si— (in which F is hydroxyl, RO—, or $RCO_2$ and R is an alkyl group having 1 to 6 carbons), epoxide, acid, aminoplast (a group produced by reaction of an activated amine with aldehyde optionally then reacted with an alcohol), or combinations of these. In certain embodiments, the uretdione compound has one or more functional groups that are groups that modify a coating property and that are not crosslinkable groups, such as silyl groups, fatty alkyl groups of longer than 12-carbon chain length, hindered amine light stabilizer (HALS) groups, ultraviolet light absorber (UVA) groups, and combinations of these. In particular examples of the method, the compound (II) may be selected from compounds having one crosslinkable group of structures (IIa) or (IIb)

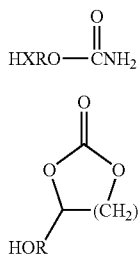

(IIa)

(IIb)

wherein X is O or $NR^2$, wherein $R^2$ is H or alkyl having 1 to 6 carbon atoms; n is 1 to 4, in certain embodiments 1 or 2; and R is alkyl, aryl, alkylaryl, or arylalkyl having up to 12 carbon atoms and optionally including one or more heteroatoms, which heteroatoms in some particular embodiments may be part of a group selected from ether, ester, amide, tertiary amine, urea, and urethane groups, and compounds having groups that modify a coating property of structures, and/or compounds having a groups that modifies a coating property, including those that improve scratch and mar resistance of a coating and that have structure (IIc1) or (IIc2),

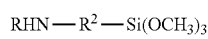

(IIc1)

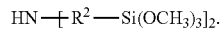

(IIc2)

wherein each $R^2$ independently has from 1 to 10 carbon atoms and that may optionally contain heteroatom linking groups and R is defined as before. Other examples include compounds with a hydroxyl group and a group that improves adhesion of repair coatings and/or improves the bond with the materials used to install glass (e.g., windshield) as tested by federal motor vehicle safety standards (MVSS 212) Crash Barrier test, which tests, among other things, the crash-worthiness of the windshield and other stationary glass installation. Examples of such groups are epoxide groups and acid groups; examples of compounds (II) with such groups include glycidol and hydroxy propionic acid. Further examples are groups that improve coating durability in outdoor exposure, such as HALs and UVA groups. Nonlimiting examples of compounds (II) having such groups are hydroxyl-functional benzotriazoles such as CGL-104 available from Cytec (3-methacryloyl-2-hydroxypropyl-3-[3'-(2"-benzotriazolyl)-4-hydroxy-5-tert-butyl]phenylpropionate, CAS #325817-05-8) and compounds of the structures (IId) and (IIe):

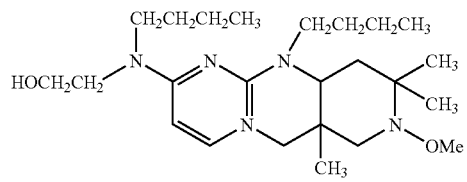

(IId)

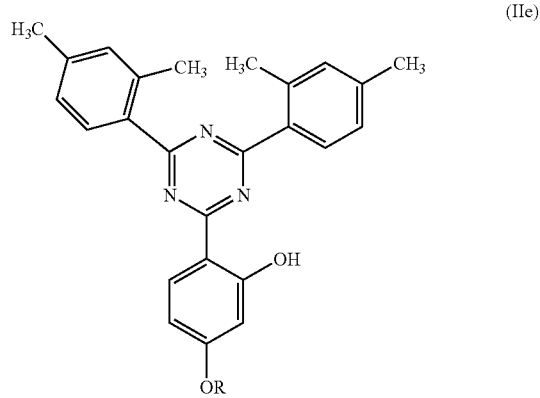

(IIe)

wherein the R group of structure (IIe) is an alkyl group that has from 1 to 12 carbon atoms.

In certain embodiments, the uretdione compound with functional groups selected from crosslinkable groups and groups that modify a coating property may have a structure selected from structures (IIa), (IIIb), (IIIc), and (IIId1) and (IIId2):

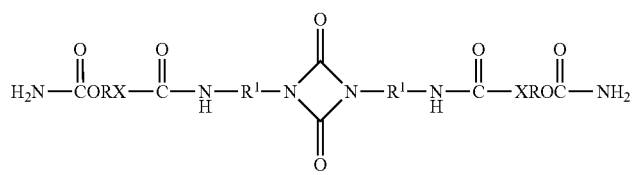

(IIIa)

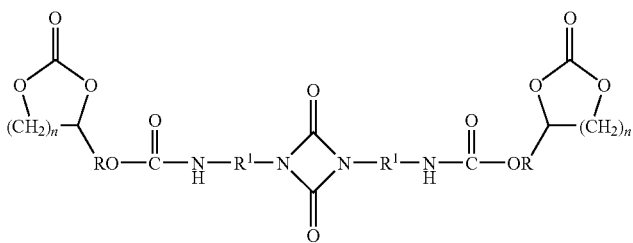
(IIIb)

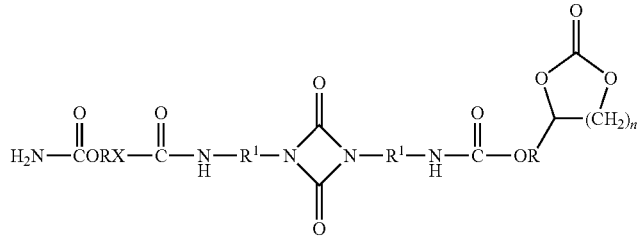
(IIIc)

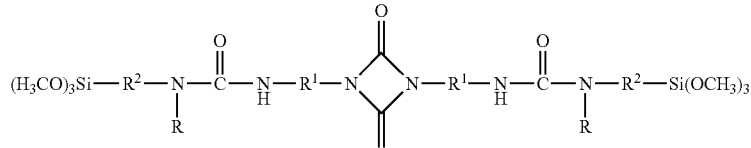
(IIId1)

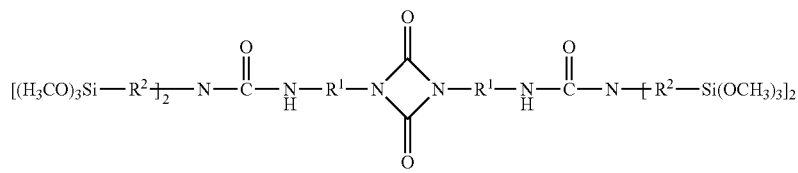
(IIId2)

wherein X, R, $R^1$, $R^2$, and n are as previously defined. Similarly, the compound (III) produced by reacting other compounds that have a hydroxyl or amine group plus a group that modifies a coating property with compound (I) will have a urethane or urea linkage resulting from reaction of the hydroxyl or amine group with an isocyanate group of compound (I) linking the group that modifies the coating property to the uretdione group. The coating composition also includes a material having a plurality of active hydrogen groups, such as a polyol compound, oligomer, or polymer, and, in the case of compounds of structures (IIIa) to (IIIc), functional groups that are reactive with the carbamate groups, cyclic carbonate groups, or (in the case of structure (IIIc)) both under curing conditions to form a covalent bond.

In certain embodiments, uretdione compounds with functional groups selected from crosslinkable groups having a structure (IIIb) or (IIIc) may be further reacted with ammonia, under conditions that preserve the uretdione ring, to produce a compound comprising a structure (IIIe) as the reaction product of a compound of the structure (IIIb):

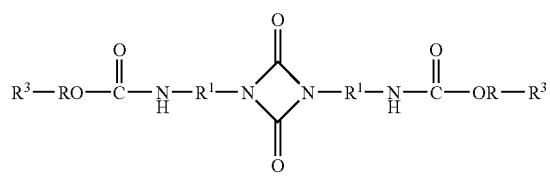
(IIIe)

wherein X, R, and $R^1$ are as previously defined and each $R^3$ independently has a structure

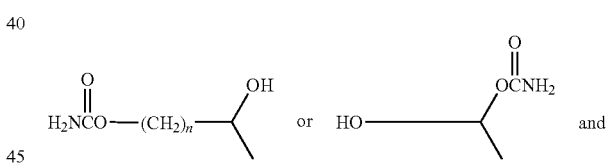

or to produce a compound comprising a structure (IIIf) as the reaction product of a compound of the structure (IIIc):

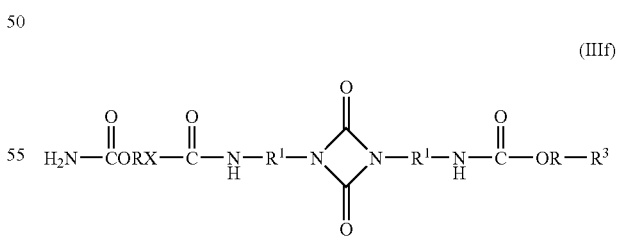
(IIIf)

wherein X, R, $R^1$, and $R^3$ are as previously defined.

Also disclosed is a method of applying the coating composition to a substrate, such as an automotive body or part, and curing the applied coating.

Also disclosed is a cured coating derived from the coating composition.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all values and further divided ranges within the entire range.

DETAILED DESCRIPTION AND EXAMPLE EMBODIMENTS

Further areas of applicability and advantages will become apparent from the following description. It should be understood that the description and specific examples, while exemplifying various embodiments of the invention, are intended for purposes of illustration and are not intended to limit the scope of the invention.

The curable coating compositions include a uretdione compound having one uretdione group and having a plurality of functional groups selected from crosslinkable groups and groups that modify a coating property. In preparing the curable coating composition, the uretdione group acts as an equivalent of a self protected diisocyanate that allows, during synthesis of the uretdione compound with the further functional group, adduction of a uretdione diisocyanate dimer (I) with a compound (II) having the further functional group and preservation of isocyanate functionality for later reaction with active hydrogen-containing groups during curing of the coating composition.

In a first step of a method for making the coating composition, a precursor uretdione diisocyanate dimer compound (I), with structure (I),

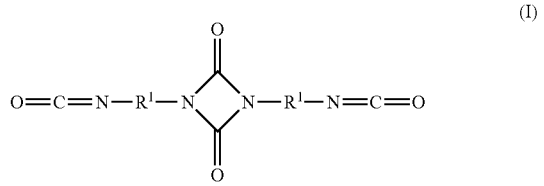

wherein each $R^1$ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylalkylene groups, and alkyl portions of alkylarylene groups may be linear, branched, or cyclic is reacted with compound (II) having both one active hydrogen group and having at least one functional group selected from crosslinkable groups and groups that modify a coating property to form a uretdione compound with a plurality of functional groups selected from crosslinkable groups and groups that modify a coating property, the reaction being carried out under conditions in which the isocyanate groups but not the uretdione group of compound (I) react with the active hydrogens of the compounds (II). In particular examples of the method, the compound (II) may be selected from compounds having one crosslinkable group of structures (IIa) or (IIb),

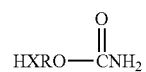
(IIa)

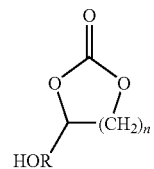
(IIb)

wherein X is O or $NR^2$, wherein $R^2$ is H or alkyl having 1 to 6 carbon atoms; n is 1 to 4, in certain embodiments 1 or 2; and R is alkyl, aryl, alkylaryl, or arylalkyl having up to 12 carbon atoms and optionally including one or more heteroatoms, which heteroatoms in some particular embodiments may be part of a group selected from ether, ester, amide, tertiary amine, urea, and urethane groups, and compounds having groups that modify a coating property of structures, and/or compounds having a groups that modifies a coating property having structure (IIc1) or (IIc2),

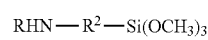
(IIc1)

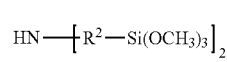
(IIc2)

wherein each $R^2$ independently has from 1 to 10 carbon atoms and R is defined as before. Other examples of compounds (II) include compounds having a hydroxyl group and a glycidyl group, such as glycidol, or a carboxyl group, such as hydroxypropionic acid. Further examples of compounds (II) include compounds having a hydroxyl group and having a UVA group, such as benzotriazole, benzophenone, triazine, cinnamate, cyanoacrylate, dicyanoethylene, or para-aminobenzoate groups; or having a hydroxyl group and a HALs group, which are rings with a tertiary amine and fully-substituted alpha carbons, such as compounds of the structures (IId) and (IIe):

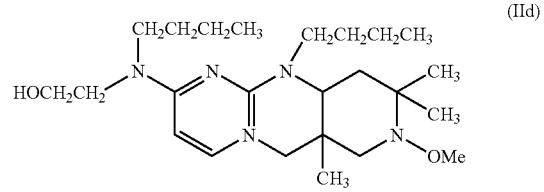
(IId)

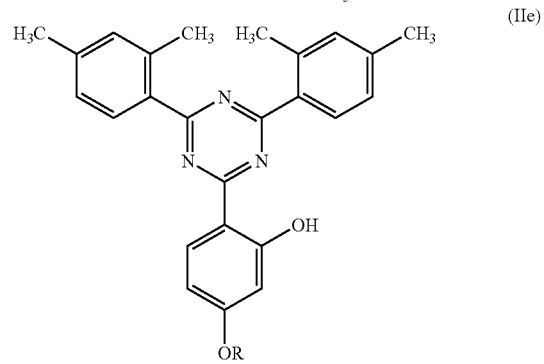
(IIe)

wherein the R group of structure (IIe) is an alkyl group that has from 1 to 12 carbon atoms.

In some embodiments, each $R^1$ is independently a divalent hydrocarbylene of 4 or 6 carbons, an isophoronylene divalent radical

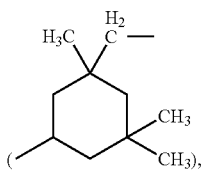

a cyclohexylene divalent radical, or a tolylene divalent radical; and in some embodiments R is methylene or a divalent polylactone radical

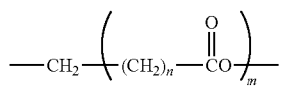

in which n is an integer from 3 to 6 and m is an integer from 1 to about 10, and in some embodiment m is an integer from 1 to about 4. Compounds of structures (I) and (II) are commercially available. Uretdiones of structure (I) may be made, for example, by dimerization of diisocyanates according to well-known methods, for example as described in U.S. Patent Application Publication No. US 2007/0032594, incorporated herein by reference. Some trimerization of the diisocyanate (to form an isocyanurate) may also occur. Commercial sources of uretdiones may contain 5 to 30% by weight of the corresponding isocyanurate of the diisocyanate. While not necessarily preferred, presence of the trimer compound does not generally cause problems in the first reaction step or in later reaction steps, but when a mixture of the uretdione and isocyanurate of a diisocyanate is used, the oligomer product will be expected to also contain the reaction product of the isocyanurate and compound (II). In one example, the compound (I) comprises the uretdione of hexamethylene diisocyanate, which is commercially available as DESMODUR® N3400 from Bayer Corporation, Pittsburgh Pa., which is a mixture of the uretdione and isocyanurate of hexamethylene diisocyanate, or DESMODUR® XP-2730.

Nonlimiting, illustrative examples of compound (II) having at least one crosslinkable group that may be used in the first method step include hydroxypropylcarbamate, hydroxybutylcarbamate, glycerin carbonate, 2-hydroxyethyl-N-methylcarbamate, hydroxyalkyl-1,3-dioxane-2-one, 1,3-propanediol monocarbamate, the corresponding polycaprolactone extensions of these alcohols (which may be prepared as described in Bammel et al., U.S. Pat. No. 5,760,127, incorporated herein by reference), and combinations of these. Nonlimiting, illustrative examples of compound (II) having at least one group that modifies a coating property that may be used in the first method step include bis(trimethoxysilylpropyl)amine, N-(n-butyl)-3-aminopropyltrimethyoxysilane, 1-ocatadecanol, glycidol, hydroxypropionic acid, and the compounds of structures (IId) and (IIe) above.

In the reaction of the method, uretdione compound (I) is capped with compound (II) by reacting about two moles or more of compound (II) per mole of compound (I) so that both terminal isocyanate groups of compound (I) are reacted. The reaction of the first step may be carried out under typical conditions for reaction of isocyanate groups with the —XH group of structure (IIa) or —OH group of structure (IIb), with the proviso that the uretdione group does not react under the selected reaction conditions. In certain embodiments, the reaction of the first step is carried out at a temperature of from about 20° C. to about 100° C. optionally in the presence of a catalyst. In other embodiments, the reaction may be carried out at a temperature of from about 20° C. to about 80° C. or at a temperature of from about 50° C. to about 80° C., again optionally in the presence of a catalyst. While a temperature above 100° C. is generally not preferred, such a temperature may be used if, under the reaction conditions, the uretdione group of the selected compound (I) does not ring open to any appreciable extent (and preferably does not ring open at all).

Nonlimiting, illustrative examples of suitable catalysts that may be used during the reaction of the first step include tertiary amines such as triethylamine, DABCO, and organotin and organobismuth compounds such as dibutyltin dilaurate, dibutyltin oxide, bismuth octoate, and combinations of these. The amount of catalyst, if used, is generally from about 0.01 to about 5 wt. % based on the total weight of compounds (I) and (II). The catalyst in certain embodiments may be from about 0.05 to about 2 wt. % based on the total weight of compounds (I) and (II), or may be from about 0.1 to about 1 wt. % based on the total weight of compounds (I) and (II).

The reaction of the uretdione precursor compound (I) and the compound (II) with one group having an active hydrogen reactive with isocyanate and having at least one functional group selected from crosslinkable groups and groups that modify a coating property may be carried out neat or in the presence of one or more non-protic (and thus unreactive) solvents. Nonlimiting examples of suitable solvents include aliphatic and aromatic hydrocarbons such as toluene, xylene, and Aromatic 100 (e.g., available from ExxonMobil as SOLVESSO 100); ketones such as methyl ethyl ketone, methyl isobutyl ketone, and methyl propyl ketone; esters such as propyl acetate, butyl acetate, amyl acetate, ethyl propionate, and propyl propionate; and glycol diethers and ether esters such as ethylene glycol diethyl ether, ethylene glycol monobutyl ether acetate, propylene glycol monopropyl ether acetate; and so on. Suitable solvents may be used in combination.

The reaction can be followed by disappearance of free isocyanate groups, which may be determined for example by titration (e.g. reaction with excess secondary amine and titration of the residual amine with acid) or by infrared spectrophotometry. The reaction may be carried out at atmospheric pressure, but higher pressures may also be used. The reaction product of the first step, compound (III), may be isolated before being used in the second reaction step or may be used without isolation or purification in the second reaction step. The reaction time until completion will vary depending upon the factors the person skilled in carrying out reaction like this should expect, such as presence of absence of catalyst, type of catalyst, reaction temperature, particular reactants selected, and concentration of reactants in the reaction medium.

The reaction between compounds (I) and (II) is carried out under conditions in which the isocyanate groups but not the uretdione group of compound (I) react to form a compound (III) comprising at least one of structures (IIIa), (IIIb), (IIIc), and (IIId):

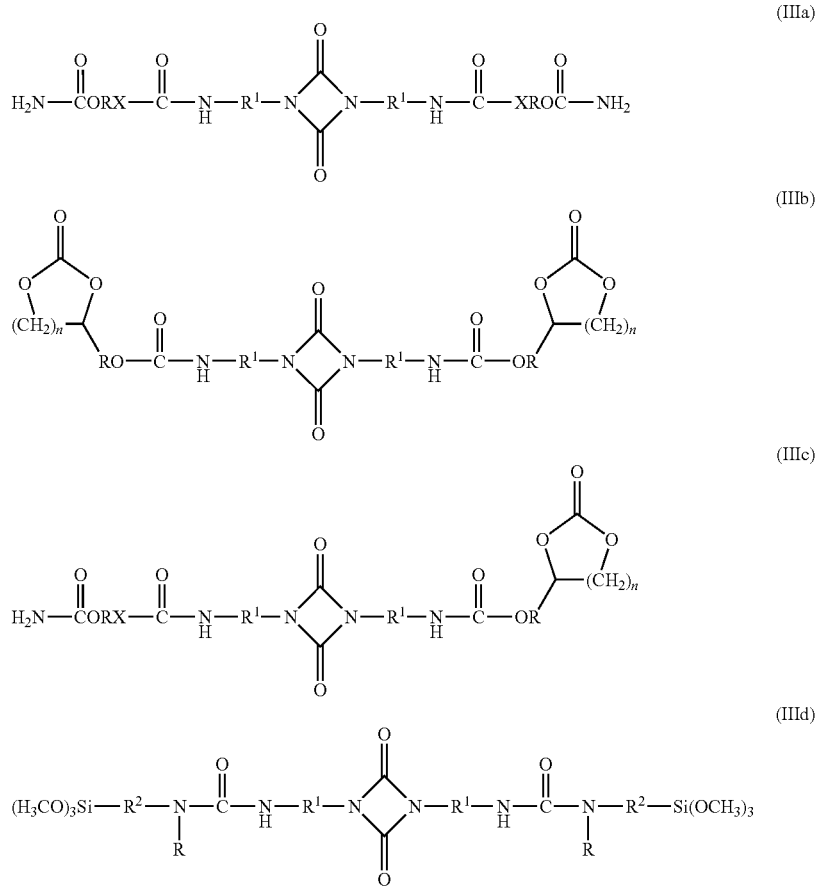

(IIIa)

(IIIb)

(IIIc)

(IIId)

wherein X, R, $R^1$, $R^2$, and n are as previously defined. The coating composition also includes a material having a plurality of active hydrogen groups, such as a polyol compound, oligomer, or polymer, and, in the case of compounds of structures (IIIa) to (IIIc), functional groups that are reactive with the carbamate groups, cyclic carbonate groups, or (in the case of structure (IIIc)) both under curing conditions to form a covalent bond.

Compounds of structures (I) and (II) are commercially available. Uretdiones of structure (I) may be made, for example, by dimerization of diisocyanates according to well-known methods, for example as described in U.S. patent application Publication No. US 2007/0032594, incorporated herein by reference. Some trimerization of the diisoycanate (to form an isocyanurate) may also occur. Commercial sources of uretdiones may contain 5 to 30% by weight of the corresponding isocyanurate of the diisocyanate. While not necessarily preferred, presence of the trimer compound does not generally cause problems in the first reaction step or in later reaction steps, but when a mixture of the uretdione and isocyanurate of a diisocyanate is used, the oligomer product will be expected to also contain the reaction product of the isocyanurate and compound (II).

When a compound (II) having a cyclic carbonate group is used as a reactant in the first reaction step, the product compound (III) will have a cyclic carbonate group, as shown in structures (IIIb) and (IIIc). Structure (IIIc) results when the compounds (II) reacted in the first step include both at least one with a cyclic carbonate group and at least one with a carbamate group. In certain embodiments, a compound (III) comprising a structure (IIIb) or (IIIc) is further reacted with ammonia (which may be in its aqueous form of ammonium hydroxide) under mild conditions that preserve the uretdione ring unreacted to produce a compound of structure (IIIe) as the reaction product of a compound of the structure (IIIb):

(IIIe)

wherein X, R, and $R^1$ are as previously defined and each $R^3$ independently has a structure

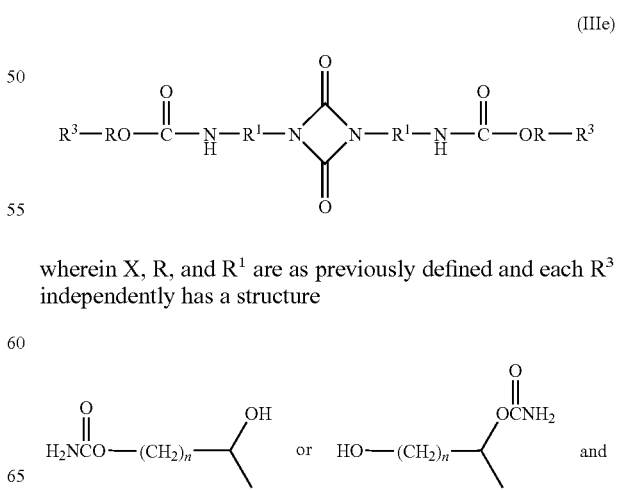

or to produce a compound comprising a structure (IIIf) as the reaction product of a compound of the structure (IIIc):

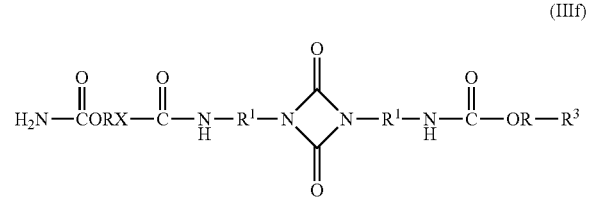

(IIIf)

wherein X, R, $R^1$, and $R^3$ are as previously defined. The reaction of the cyclic carbonate ring with ammonia may be carried out under mild conditions at temperatures at which the uretdione ring is preserved; for example at room temperature or lower, particularly at 10° C. or lower, and more particularly at 0° C. or lower. It can be carried out in organic solvents such as methanol, or the reaction can be carried in water, or a mixture of water and organic solvents. When water is used as the sole solvent or as a part of a solvent blend, ammonium hydroxide may be used in place of ammonia. Alternatively, liquefied ammonia may be used as the solvent.

The uretdione compound with functional groups selected from crosslinkable groups and groups that modify a coating property is combined with a material having a plurality of active hydrogen groups in a curable coating composition, with the caveat that when the uretdione compound has as functional groups one or more crosslinkable groups then the curable coating composition includes another functional group that is reactive with the crosslinkable group under curing conditions to form a covalent bond. In certain embodiments, the material having at least two active hydrogens may be represented by a formula $P(XH)_m$, in which X is as previously defined or is a sulfur atom, m is an integer that is 1 or greater when X is NH or 2 or greater when X is not NH, and P represents an m-valent core of the reactant. In certain embodiments, m is an integer from 2 to about 40; m may also be an integer from 2 to about 20, or from 2 to about 10. While the material $P(XH)_m$ may be a simple polyfunctional compound, in certain embodiments, the material $P(XH)_m$ is an oligomer or polymer; in such embodiments, the active hydrogen groups may be in terminal positions, located along the oligomer backbone, or both, preferably with a plurality of active hydrogens to form a cured or crosslinked network under cure conditions that cause the four-membered uretdione ring to cleave and react with the active hydrogens.

Nonlimiting, illustrative examples of active hydrogen groups of the material having a plurality of active hydrogens are hydroxyl groups, primary amine groups, secondary amine groups, and thiol groups. The material having a plurality of active hydrogens in certain embodiments may have (and thus m may be) 2 to about 40 or 2 to about 20, or from 2 to about 10 groups containing active hydrogens, which may be selected from the examples of such groups just mentioned. For example, material $P(XH)_m$ can be selected from polyols (including diols, triols, and polyols of higher functionality $(P(OH)_m)$, polyamines (including diamines, triamines, and polyamines of higher functionality $(P(NR^2H)_m)$), aminoalcohols $(P(OH)_n(NR^2H)_{m-n}$, wherein n is an integer of at least one and less than m), and combinations of these. Particular, illustrative examples of suitable materials having a plurality of active hydrogens include 1,4-butanediol, 1,3-butanediol, 2,3-butanediol, 1,6-hexanediol, neopentyl glycol, 1,3-propanediol, 1,5-pentanediol, 1,6-hexanediol, 1,9-nonanediol, ethylene glycol, diethylene glycol, triethylene glycol and tetraethylene glycol, propylene glycol, dipropylene glycol, glycerol, cyclohexanedimethanols, 2-methyl-2-ethyl-1,3-propanediol, 2-ethyl-1,3-hexanediol, 2,2,4-trimethyl-1,3-pentanediol, cyclohexanediols, trimethylolpropane, trimethylolethane, trimethylolbutane, 3,5,5-trimethyl-2,2-dihydroxymethylhexane-1-ol, glycerol, 1,2,6-hexane triol glycerin, pentaerythritol, ditrimethylolpropane, diglycerol and ditrimethylolethane; ethylenediamine, diethylenetriamine, triethylenetetraamine, propylenediamine, butylenediamine, cyclohexylenediamine, tris(2-aminoethyl)amine, hexamethylenediamine, 1,8-diaminoctane, the isomers of diaminocyclohexane 2,5-diamino-2,5-dimethylhexane, 1-amino-3,3,5-trimethyl-5-aminomethylcyclohexane, nonanetriamine, the isomers of 1-methylcyclohexanediamine, other alkyl-substituted cyclohexanediamines such as isopropyl-2,4- and/or -2,6-diaminocyclohexane, 1,3-cyclohexanebis(methylamine), 5-amino-2,2,4-trimethyl-1-cyclopentane-methylamine, 2,4'- and 4,4'-methylenebis(cyclohexylamine), 3,3'-dimethyl-4,4'-methylenebis (cyclohexylamine), the isomers of diaminodicyclohexylmethane containing a methyl group as main substituent (monomethyldiaminodicyclohexylmethane), 3(4)-aminomethyl-1-methylcyclohexylamine, and bridged cyclohexanediamines; and aminoalcohols such as ethanolamine, aminoethylethanolamine, 2-amino-1-propanol, 2-amino-2-methyl-1-propanol (AMP), 2-amino-2,2-dimethylethanol, 2-amino-2-ethyl-1,3-propanediol (AEPD), tris(hydroxymethyl)-aminomethane, 1-amino-1-methyl-2-hydroxycycloexane, and 2-amino-2-methyl-1-butanol; and combinations of these.

Examples in which the active hydrogen functional material is an oligomer include, without limitation, any of the above-mentioned polyols that has been extended by condensation with a lactone, such as epsilon-caprolactone; low molecular weight, hydroxyl-functional polyesters, polyureas, or polyurethanes; and dimer fatty acid diols Illustrative examples of specific such materials include trimethylolpropane extended with epsilon-caprolactone (which may be prepared with a reactant ratio of 1 mole of trimethylolpropane to from 3 to 12 moles of epsilon-caprolactone), the reaction product of the trimer of isophorone diisocyanate with 2-ethyl-1,3-hexanediol, and Polycin M-365 from Vertellus. Examples in which the material having a plurality of active hydrogens is a polymer are hydroxyl-, primary amine- and secondary amine-group containing vinyl polymers (particularly acrylic polymers, polyesters, polyureas, or polyurethanes, and polysiloxanes, star ester oligomers, urethane oligomers, and dimer-fatty carbamate compounds.

The polymer or oligomer may have a number average molecular weight of from 600 to 10,000 and may have an equivalent weight, based on active hydrogen groups, of from 114 to 2000. When the uretdione compound has as functional groups one or more crosslinkable groups, for the curable coating composition usefully includes another functional group that is reactive with the crosslinkable group under curing conditions to form a covalent bond. Such functional group reactive with the crosslinkable group under curing conditions may be a part of a compound, oligomer, or polymer; preferably, such a compound, oligomer, or polymer includes a plurality of such functional groups and/or includes such functional groups in addition to one or more active hydrogen groups.

The curable coating compostions may be cured under conditions known to cleave a uretdione ring of compound (III) and under which the resulting isocyanate groups will react with the active hydrogens. Suitable reaction temperatures may depend in part on the catalyst used, if a catalyst is used.

Typical reaction temperatures when a catalyst for opening the uretdione ring is used are from about from about 20° C. to about 115° C. In other embodiments, the reaction may be carried out at a temperature of from about 20° C. to about 110° C. or at a temperature of from about 50° C. to about 110° C. or at a temperature of from about 80° C. to about 110° C. Nonlimiting, illustrative examples of suitable catalysts for opening the uretdione ring that may be included in the curable coating composition are quarternary ammonium hydroxides or fluorides as described in U.S. Pat. No. 6,914,115, column 2, lines 50-60 and column 5, line 47 to column 6, line 34, which are incorporated herein by reference; organometallic compounds as described in U.S. patent application Publication No. US 2004/0219367 in paragraphs [0016]-[0021], [0050]-[0053], and [0073]-[0075, which are incorporated herein by reference; tetraalkyl ammonium carboxylate compounds as described in U.S. patent application Publication No. US 2005/0003206 in paragraphs [0017]-[0019] and [0060]-[0061, which are incorporated herein by reference; such catalysts as described in U.S. patent application Publication No. US 2005/0096450 in paragraphs [0023]-[0026], [0038]-[0041], and [0056]-[0071, which are incorporated herein by reference; metal acetylacetonates, metal hydroxides, and metal alkoxides such as zinc(II) acetylacetonate, calcium acetylacetonate, magnesium acetylacetonate, aluminum(III) acetylacetonate, zirconium(IV) acetylacetonate, and aluminium(III) acetylacetonate; phosphorous-containing catalysts such as described in U.S. patent application Publication No. US 2007/0266897 in paragraphs [0015] and [0028]-[0031], which are incorporated herein by reference; organometallic catalysts such as described in U.S. patent application Publication No. US 2005/0239992 in paragraphs [0015]-[0018], [0060]-[0063], and [0088] and the catalysts mentioned in paragraph [0100], each of which paragraphs are incorporated herein by reference; catalysts such as described in U.S. patent application Publication No. US 2005/00239956 in paragraphs [0015]-[0033], [0039]-[0057], [0067]-[0084], [0101]-[0105], and [0128]-[0136], which are incorporated herein by reference; catalysts such as described in U.S. patent application Publication No. US 2008/0097025 in paragraphs [0025]-[0029] and [0043]-[0050], which are incorporated herein by reference; and catalysts such as described in U.S. patent application Publication No. US 2008/0139753 in paragraphs [0014]-[0018] and [0030]-[0042], which are incorporated herein by reference; these may be used in combination if desired. It is also possible to cure the coating composition in the absence of a catalyst for opening up the uretdione ring at higher temperatures. In general, the cure reaction between uretdione groups and active hydrogen groups can be carried out at a temperature from about 100° C. to about 180° C. In certain embodiments, a temperature from about 120° C. to about 160° C. is used.

Also disclosed is a curable coating composition including (a) at least one aminoplast resin crosslinker. An aminoplast for purposes of the invention is a material obtained by reaction of an activated nitrogen with a lower molecular weight aldehyde, optionally further reacted with an alcohol (preferably a mono-alcohol with one to four carbon atoms) to form an ether group. Preferred examples of activated nitrogens are activated amines such as melamine, benzoguanamine, cyclohexylcarboguanamine, and acetoguanamine; ureas, including urea itself, thiourea, ethyleneurea, dihydroxyethyleneurea, and guanylurea; glycoluril; amides, such as dicyandiamide; and carbamate functional compounds having at least one primary carbamate group or at least two secondary carbamate groups. The aminoplast resins are in certain embodiments amine/formaldehyde condensates, although other aldehydes, such as acetaldehyde, crotonaldehyde, and benzaldehyde, may be used. Non-limiting examples of suitable aminoplast resins include monomeric or polymeric melamine formaldehyde resins, including melamine resins that are partially or fully alkylated using alcohols that typically have one to six, preferably one to four, carbon atoms, such as hexamethoxymethylated melamine; urea-formaldehyde resins including methylol ureas and siloxy ureas such as butylated urea formaldehyde resin, alkylated benzoguanimines, guanyl ureas, guanidines, biguanidines, polyguanidines, and the like.

Suitable coating compositions may be one, two or multi-component coating compositions and may be in the form of powder coating compositions, powder slurry coating compositions, waterborne coatings/aqueous dispersions, or solvent borne coating compositions.

In certain embodiments, the curable coating composition is a clearcoat coating composition. As used herein, the term "clearcoat" refers to a generally transparent coating layer which is positioned over a basecoat or color coat layer. Furthermore, the clearcoat is generally the outermost coating over the substrate. In addition to the uretdione compound and active hydrogen containing material, the curable clearcoat coating composition may include a further polymer or oligomer that is also reactive with the aminoplast resin crosslinker. The coating composition used in the method of the invention may include a catalyst to enhance the cure reactions when the aminoplast resin crosslinker is included. Nonlimiting, suitable examples include para-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the curable compositions include Lewis acids, zinc salts, and tin salts.

A solvent or solvents may be included in the coating composition. In general, the solvent can be any that does not interfere in the crosslinking reactions. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents. In general, protic solvents such as alcohol and glycol ethers are avoided when the coating composition includes the optional polyisocyanate crosslinker, although small amounts of protic solvents can be used even though it may be expected that some reaction with the isocyanate groups may take place during curing of the coating.

Additional agents, for example hindered amine light stabilizers, ultraviolet light absorbers, antioxidants, surfactants, stabilizers, wetting agents, rheology control agents, dispersing agents, adhesion promoters, etc. may be incorporated into the coating composition. Such additives are well-known and may be included in amounts typically used for coating compositions.

The coating compositions can be coated on a substrate by spray coating. Electrostatic spraying is a preferred method.

The coating composition can be applied in one or more passes to provide a film thickness after cure of typically from about 20 to about 100 microns.

The coating composition can be applied onto many different types of substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, primer surfacer, and/or basecoat, cured or uncured.

After application of the coating composition to the substrate, the coating is cured, preferably by exposing the coating layer to heat for a length of time sufficient to cause the reactants to form an insoluble polymeric network. The cure temperature is usually from about 105° C. to about 175° C., and the length of cure is usually about 15 minutes to about 60 minutes. Preferably, the coating is cured at about 120° C. to about 150° C. for about 20 to about 30 minutes.

In one embodiment, as mentioned, the coating composition is utilized as the clearcoat of an automotive composite color-plus-clear coating. The pigmented basecoat composition over which it is applied may be any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition is generally applied wet-on-wet over a basecoat coating composition as is widely done in the industry. The coating compositions are preferably subjected to conditions so as to cure the coating layers as described above.

The coating composition may also be utilized as a one-layer topcoat or as a basecoat coating. A one-layer topcoat or basecoat coating composition includes one or more of the pigments mentioned above, and provides the color and/or metallic effect. A curable basecoat coating including the oligomer (IV) may be used with a clearcoat coating composition such as those described in the art, including those containing film forming materials with hydroxyl, carboxyl, epoxide, and/or carbamate groups and crosslinkers including aminoplasts, polyisocyanates, polyepoxides, and polycarboxylic acids.

The substrate to which the curable coating composition is applied may be an automotive body or part. The applied coating composition is then cured to provide a coated automotive body or part.

The invention is further described in the following example. The example is merely illustrative and does not in any way limit the scope of the invention as described and claimed. All parts are parts by weight unless otherwise noted.

EXAMPLES

Example 1 of the Invention

Bis(trimethoxysilylpropyl)amine (Dynasylan 1124, 0.519 mole) and 150 ml xylene were charged to a flask under nitrogen and agitated. A solution of homopolymer of hexamethylene diisocyanate (DESMODUR N3400, 0.519 equivalents free NCO, 67% by weight in xylene) was added dropwise to the amine solution over 1 hour. The temperature of the reaction was kept between 20 and 40° C. The extent of reaction was monitored by infrared spectroscopy, and the reaction was deemed complete at the disappearance of the isocyanate peak after 3-4 hours.

A 2K, low-bale composition was prepared from the product as follows. The A component (E222CM001L, 8.35 g) (available from BASF Corporation) which is a hydroxyl functional acrylic was charged to the flask. The B component (N52CD063, 2.96 g) (available from BASF Corporation) which contains isocyanate functionality was charged to the flask followed by the Dynasylan 1124 capped uretdione (0.59 g, 65.28% nonvolatiles) prepared in this example. The mixture was stirred and allowed to sit for 2 min. A draw down was performed on a metal panel using a #6 gap. The panel was allowed to stand at ambient temperature for 10 min, and was then placed in a 232° F. oven for 1 hr.

A second 2K low bake composition was similarly prepared from the A component (E222CM001L, 8.32 g), the B component (N52CD063, 2.99 g), and the Dynasylan 1124 capped uretdione (1.14 g, 65.28% nonvolatiles) prepared in this example. The mixture was stirred and allowed to sit for 2 min. A draw down was performed on a metal panel using a #6 gap. The panel was allowed to stand at ambient temperature for 10 min, and was then placed in a 232° F. oven for 1 hr.

A third 2K low bake composition was similarly prepared from the A component (E222CM001L, 8.31 g), the B component (N52CD063, 2.98 g), and the Dynasylan 1124 capped uretdione (1.71 g, 65.28% nonvolatiles) prepared in this example. The mixture was stirred and allowed to sit for 2 min. A draw down was performed on a metal panel using a #6 gap. The panel was allowed to stand at ambient temperature for 10 min, and was then placed in a 232° F. oven for 1 hr.

A fourth 2K low bake composition was similarly prepared from the A component (E222CM001L, 8.35 g), the B component (N52CD063, 3.00 g), and the Dynasylan 1124 capped uretdione (2.85 g, 65.28% nonvolatiles) prepared in this example. The mixture was stirred and allowed to sit for 2 min. A draw down was performed on a metal panel using a #6 gap. The panel was allowed to stand at ambient temperature for 10 min, and was then placed in a 232° F. oven for 1 hr.

Example 2 of the Invention

N-(n-butyl)-3-aminopropyltrimethoxysilylpropyl)amine (Dynasylan 1189, 0.519 mole) and 250 ml xylene were charged to a flask under nitrogen and agitated. A solution of homopolymer of hexamethylene diisocyanate (DESMODUR N3400, 0.519 equivalents free NCO, 67% by weight in xylene) was added dropwise t the amine solution over 2.5 hours. the temperature of the reaction was kept between 20 and 40° C. The extent of reaction was monitored by infrared spectroscopy, and the reaction was deemed complete at the disappearance of the isocyanate peak after 3-4 hours.

A 2K, low-bake composition was prepared from the product as follows. The A component (E222CM001L, 8.33 g) was charged to the flask. The B component (N52CD063, 3.00 g) was charged to the flask followed by the Dynasylan 1189 capped uretdione (0.58 g, 53.65% nonvolatiles) prepared in this example. The mixture was stirred and allowed to sit for 2 min. A draw down was performed on a metal panel using a #6 gap. The panel was allowed to stand at ambient temperature for 10 min, and was then placed in a 232° F. oven for 1 hr.

A second 2K, low-bake composition was similarly prepared from the A component (E222CM001L, 8.32 g), the B component (N52CD063, 2.99 g), and the Dynasylan 1189 capped uretdione (1.17 g, 53.65% nonvolatiles) prepared in this example. The mixture was stirred and allowed to sit for 2 min. A draw down was performed on a metal panel using a #6 gap. The panel was allowed to stand at ambient temperature for 10 min, and was then placed in a 232° F. oven for 1 hr.

A third 2K, low-bake composition was similarly prepared from the A component (E222CM001L, 8.35 g), the B component (N52CD063, 2.99 g), and the Dynasylan 1189 capped uretdione (1.70 g, 53.65% nonvolatiles) prepared in this example. The mixture was stirred and allowed to sit for 2 min. A draw down was performed on a metal panel using a #6 gap. The panel was allowed to stand at ambient temperature for 10 min, and was then placed in a 232° F. oven for 1 hr.

A fourth 2K, low-bake composition was similarly prepared from the A component (E222CM001L, 8.38 g, the B component (N52CD063, 3.00 g), and the Dynasylan 1189 capped uretdione (2.86 g, 53.65% nonvolatiles) prepared in this example. The mixture was stirred and allowed to sit for 2 min. A draw down was performed on a metal panel using a #6 gap. The panel was allowed to stand at ambient temperature for 10 min, and was then placed in a 232° F. oven for 1 hr.

Example 3 of the Invention

Hydroxy propyl carbamate (HPC, 0.493 mole, 58.7 g), dibutyltin dilaurate (DBTL, Fastcat 4202, 0.00025 mole, 0.16 g), and methyl propyl ketone (MPK, 200 ml) were charged to a flask under nitrogen. While agitating, the mixture was heated to 60° C. A solution of homopolymer of hexamethylene diisocyanate (DESMODUR N 3400, 0.298 mole, 100 g) in MPK (50 ml) was added dropwise to the HPC solution over 1.5 hr. The temperature of the reaction was kept between 60-80° C., and the reaction was monitored by IR. The reaction was deemed complete after 5 hrs by the disappearance of the isocyanate peak by IR.

A coating was prepared with the hydroxy propyl carbamate capped uretdione prepared in this example. The hydroxy propyl carbamate capped uretdione of this example (8.90 g, 43.34% nonvolatiles), Polycin M-365 (polyol, 2.04 g, OH #365), Resimene HM 2608 (0.26 g, 90% in isobutanol), and zinc acetylacetonate hydrate (0.09 g) were charged to a flask and agitated until the zinc acetylacetonate hydrate dissolved. A draw down was performed on a metal panel using a #8 gap. The panel was placed in an 110° C. oven for 1 hr.

A second coating was prepared. The hydroxy propyl carbamate capped uretdione of this example (8.90 g, 43.34% nonvolatiles), Polycin M-365 (polyol, 2.04 g, OH #365), Resimene HM 2608 (0.26 g, 90% in isobutanol), and zinc acetylacetonate hydrate (0.09 g) were charged to a flask and agitated until the zinc acetylacetonate hydrate dissolved. A draw down was performed on a metal panel using a #8 gap. The panel was allowed to stand at ambient conditions for 20 min. The panel was then placed in an 110° C. oven for 1 hr.

A third coating was prepared. The hydroxy propyl carbamate capped uretdione of this example (8.92 g, 43.34% nonvolatiles), Polycin M-365 (polyol, 2.02 g, OH #365), and Resimene HM 2608 (0.25 g, 90% in isobutanol), were charged to a flask and agitated. A draw down was performed on a metal panel using a #8 gap. The panel was placed in an 110° C. oven for 1 hr The invention has been described in detail with reference to preferred embodiments thereof. It should be understood, however, that variations and modifications can be made within the spirit and scope of the invention and of the following claims.

What is claimed is:

1. A curable coating composition, comprising
(a) a compound having a structure selected from the group consisting of:

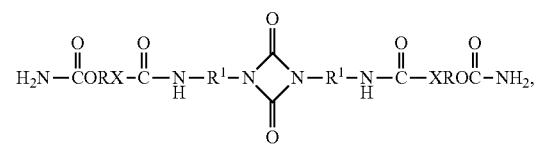

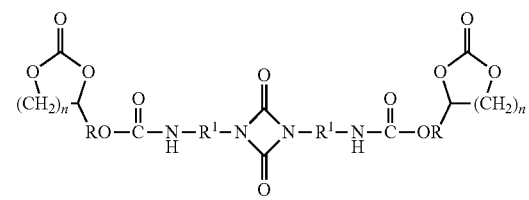

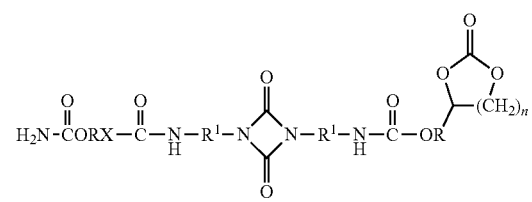

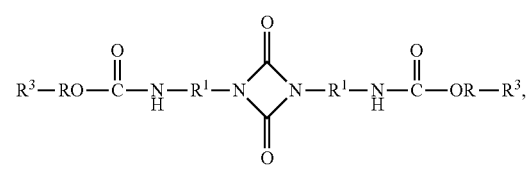

and

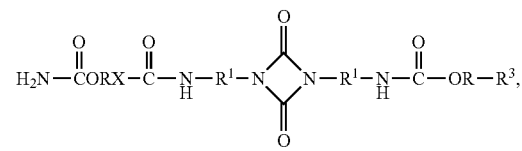

wherein X is O or $NR^2$, wherein $R^2$ is H or alkyl having 1 to 6 carbon atoms; n is 1 to 4; and R is alkyl, aryl, alkylaryl, or arylalkyl having up to 12 carbon atoms and optionally including one or more heteroatoms, each $R^1$ is independently selected from alkylene groups having 1 to 12 carbon atoms, arylene groups having 5 to 12 carbon atoms, and arylalkylene and alkylarylene groups having 6 to 15 carbon atoms, and each $R^3$ independently has a structure

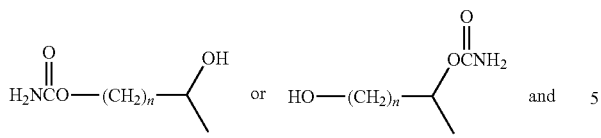

(b) a material having a plurality of active hydrogen-containing groups.

2. A coated article prepared by applying a layer of the curable coating composition of claim 1 to an article and curing the applied layer.

3. A method of preparing a coating composition, comprising
   (a) reacting a uretdione compound (I)

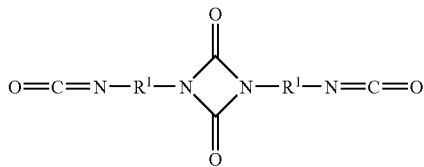

wherein each $R^1$ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylalkylene groups, and alkyl portions of alkylarylene groups may be linear, branched, or cyclic with two moles or more of a compound (II) per mole of compound (I) so that both terminal isocyanate groups of compound (I) are reacted, wherein compound (II) comprises a member selected from the group consisting of:

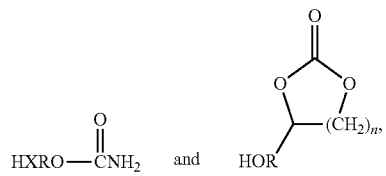

wherein X is O or $NR^2$, wherein $R^2$ is H or alkyl having 1 to 6 carbon atoms; n is 1 to 4; and R is alkyl, aryl, alkylaryl, or arylalkyl having up to 12 carbon atoms and optionally including one or more heteroatoms; and
   (b) combining the uretdione compound with a plurality of functional groups with a material having a plurality of active hydrogen groups in the curable coating composition.

4. A method of preparing a coating composition according to claim 3, wherein the material having a plurality of active hydrogen groups is a polyol.

5. A method of preparing a coating composition according to claim 3, wherein the coating composition is a clearcoat coating composition.

* * * * *